United States Patent
Nakano

(10) Patent No.: US 11,046,120 B2
(45) Date of Patent: Jun. 29, 2021

(54) TIRE

(71) Applicant: Sumitomo Rubber Industries, Ltd., Kobe (JP)

(72) Inventor: Kazuhiro Nakano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 271 days.

(21) Appl. No.: 16/020,199

(22) Filed: Jun. 27, 2018

(65) Prior Publication Data
US 2019/0023079 A1 Jan. 24, 2019

(30) Foreign Application Priority Data
Jul. 19, 2017 (JP) .............................. JP2017-140188

(51) Int. Cl.
*B60C 11/11* (2006.01)
*B60C 11/03* (2006.01)
*B60C 11/12* (2006.01)

(52) U.S. Cl.
CPC .......... *B60C 11/11* (2013.01); *B60C 11/0304* (2013.01); *B60C 11/0306* (2013.01); *B60C 11/0311* (2013.01); *B60C 11/1204* (2013.01); *B60C 2011/0346* (2013.01); *B60C 2011/0358* (2013.01); *B60C 2011/0365* (2013.01); *B60C 2011/1213* (2013.01); *B60C 2011/1254* (2013.01)

(58) Field of Classification Search
CPC . B60C 11/11; B60C 11/0304; B60C 11/0306; B60C 11/0311; B60C 11/1263; B60C 11/1369
See application file for complete search history.

(56) References Cited

U.S. PATENT DOCUMENTS

| 6,481,480 B1* | 11/2002 | Schuster | ................. B60C 11/11 |
| | | | 152/209.18 |
| 2002/0124922 A1* | 9/2002 | Carra | ................. B60C 11/1315 |
| | | | 152/209.18 |
| 2003/0024621 A1* | 2/2003 | Neugebauer | ........ B60C 11/0304 |
| | | | 152/209.22 |

(Continued)

FOREIGN PATENT DOCUMENTS

| DE | 102010016978 A1 * | 11/2011 | ............. B60C 11/13 |
| JP | 2016-88219 A | 5/2016 | |

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A tire comprises a tread portion 2. The tread portion 2 comprises a plurality of lateral grooves 8 extending in a tire axial direction and blocks 9 divided by the lateral grooves 8. At least one of the blocks 9 includes a first lateral block wall 16 positioned on a side of one of the lateral grooves 8 adjacent thereto and a sipe pair 22 consisting of a first lateral sipe 23 and a second lateral sipe 24 adjacent to each other in the tire axial direction with a gap 25 therebetween. The first lateral block wall 16 has, at a center portion thereof in the tire axial direction, a convex portion 20 partly protruding toward the one of the lateral grooves 8. The gap 25 is arranged in a convex portion projection area 26 obtained by extending the convex portion 20 along a tire circumferential direction.

16 Claims, 8 Drawing Sheets

(56) References Cited

U.S. PATENT DOCUMENTS

| | | | |
|---|---|---|---|
| 2011/0041972 A1* | 2/2011 | Kageyama | B60C 11/0306 |
| | | | 152/209.15 |
| 2011/0162770 A1* | 7/2011 | Yamakawa | B60C 11/005 |
| | | | 152/209.18 |
| 2012/0222788 A1* | 9/2012 | Nishiwaki | B60C 11/12 |
| | | | 152/209.18 |
| 2017/0120691 A1* | 5/2017 | Arai | B60C 11/11 |
| 2017/0225514 A1* | 8/2017 | Iwata | B60C 11/0306 |

* cited by examiner

TIRE

TECHNICAL FIELD

The present invention relates to a tire capable of exerting excellent on-ice/on-snow performance and noise performance on a dry road surface.

BACKGROUND ART conventionally, various types of tires suitable for running on icy/snowy roads have been proposed (for example, see Japanese unexamined Patent Application Publication No. 2016-088219).

By the way, in order to improve traction performance of a tire on a snowy road, widths of lateral grooves of a tread portion of the tire tend to be set relatively large. On the other hand, the tire configured as such tends to have a large pumping sound generated by the lateral grooves during running on a dry road surface.

SUMMARY OF THE INVENTION

The present invention was made in view of the above, and a primary object thereof is to provide a tire capable of exerting excellent on-ice/on-snow performance and the noise performance on a dry road surface.

In one aspect of the present invention, a tire comprises a tread portion comprising a plurality of lateral grooves extending in a tire axial direction and blocks divided by the lateral grooves, wherein at least one of the blocks comprises a first lateral block wall positioned on a side of one of the adjacent lateral grooves and a sipe pair consisting of a first lateral sipe and a second lateral sipe adjacent to each other in the tire axial direction with a gap therebetween, the first lateral block wall has, at a center portion thereof in the tire axial direction, a convex portion partly protruding toward the one of the adjacent lateral grooves, and the gap is arranged in a convex portion projection area obtained by extending the convex portion along a tire circumferential direction.

In another aspect of the invention, it is preferred that the blocks are shoulder blocks each arranged closest to one of tread edges.

In another aspect of the invention, it is preferred that the convex portion has a trapezoidal ground contacting surface in a plan view of the at least one of the blocks.

In another aspect of the invention, it is preferred that the convex portion includes a center position in the tire axial direction of the first lateral block wall.

In another aspect of the invention, it is preferred that each of the first lateral sipe and the second lateral sipe extends in a zigzag manner.

In another aspect of the invention, it is preferred that at least one of the blocks has a plurality of the sipe pairs having different lengths of the gaps in the tire axial direction.

In another aspect of the invention, it is preferred that the length of the gap or each of the lengths of the gaps in the tire axial direction is in a range of from 1% to 10% of a width in the tire axial direction of the at least one of the blocks.

In another aspect of the invention, it is preferred that the at least one of the blocks comprises a second lateral block wall positioned on a side of the other one of the adjacent lateral grooves, and the second lateral block wall has a concave portion partly recessed at a center portion thereof in the tire axial direction.

In another aspect of the invention, it is preferred that a pair of the blocks are adjacent in the tire circumferential direction with one of the lateral grooves therebetween, groove walls of the one of the lateral grooves are formed by the first lateral block wall of one of the pair of the blocks and the second lateral block wall of the other one of the pair of the blocks, and the convex portion and the concave portion face each other.

In another aspect of the invention, it is preferred that a minimum groove width of the one of the lateral grooves if the concave portion is completely filled is in a range of from 0.70 to 0.90 times a maximum groove width of the one of the lateral grooves.

In another aspect of the invention, it is preferred that the one of the lateral grooves has at least one tie bar portion formed by raising a groove bottom thereof and connecting between the pair of the blocks.

In another aspect of the invention, it is preferred that the tie bar portion includes a first tie bar portion connecting the convex portion and the concave portion.

In another aspect of the invention, it is preferred that at least a part of the first tie bar portion is arranged in a gap projection area obtained by extending the gap or the gaps along the tire circumferential direction.

In another aspect of the invention, it is preferred that the tie bar portion includes a second tie bar portion arranged on one side in the tire axial direction of the first tie bar portion and a third tie bar portion arranged on the other side in the tire axial direction of the first tie bar portion.

DESCRIPTION OF THE PREFERRED EMBODIMENT

An embodiment of the present invention will now be described in conjunction with accompanying drawings.

Figure 1:
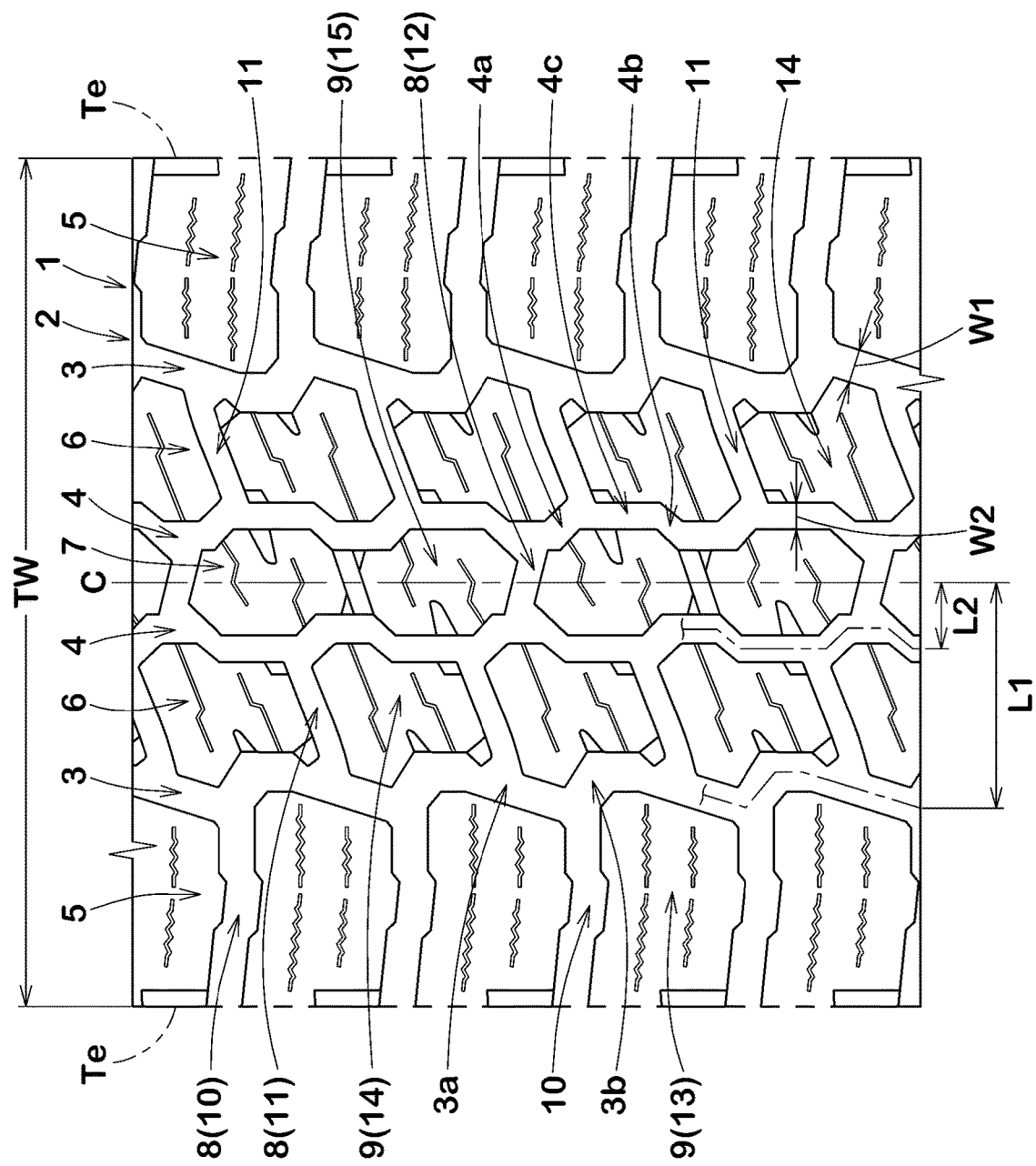
FIG. 1 is a development view of a tread portion of a tire according to an embodiment of the present invention.

FIG. 1 is a development view of a tread portion 2 of a tire 1 in this embodiment. The tire 1 in this embodiment is suitably used as a pneumatic tire for a 4WD-car such as an SUV that can run not only on a paved road but also on a rough terrain, for example. However, the tire of the present invention is not limited to such an embodiment. In another embodiment of the present invention, the tire 1 can be used as a tire for heavy load, a non-pneumatic tire not filled with pressurized air therein, or the like, for example.

As shown in FIG. 1, the tread portion 2 is provided at least with shoulder main grooves 3 and crown main grooves 4 extending continuously in a tire circumferential direction, for example. Each of the shoulder main grooves 3 is arranged closest to corresponding one of tread edges Te, for example. Each of the crown main grooves 4 is provided between corresponding one of the shoulder main grooves 3 and a tire equator C. Thereby, the tread portion 2 in this embodiment is provided with four main grooves. However, the present invention is not limited to such an embodiment.

In a case of a pneumatic tire, the "tread edges Te" are defined as outermost ground contacting positions in a tire axial direction when the tire 1 in a standard state is in contact with a flat surface with zero camber angle by being loaded with a standard tire load. The standard state is a state in which the tire is mounted on a standard rim, inflated to a standard pressure, and loaded with no tire load. Dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that each of the shoulder main grooves 3 includes first inclined portions 3a and second inclined portions 3b, for example. The first inclined portions 3a and the second inclined portions 3b are inclined in opposite directions to each other. Each of the shoulder main grooves 3 in this embodiment is formed in a zigzag manner in which the first inclined portions 3a and the second inclined portions 3b are arranged alternately in the tire circumferential direction.

It is preferred that each of the crown main grooves 4 includes third inclined portions 4a, fourth inclined portions 4b, and longitudinal groove portions 4c, for example. The third inclined portions 4a and the fourth inclined portions 4b are inclined in opposite directions to each other. Each of the longitudinal groove portions 4c is disposed between one of the third inclined portions 4a and its adjacent one of the fourth inclined portions 4b so that they are not directly connected with each other and extends along the tire circumferential direction.

It is preferred that each of the shoulder main grooves 3 is arranged so that a distance L1 between a groove center line thereof and the tire equator C is in a range of from 0.20 to 0.30 times a tread width TW, for example. It is preferred that each of the crown main grooves 4 is arranged so that a distance L2 between a groove center line thereof and the tire equator C is in a range of from 0.05 to 0.12 times the tread width TW, for example. Note that the tread width TW is a distance in the tire axial direction of the tire in the standard state between one of the tread edges Te and the other one of the tread edges Te.

It is preferred that each of the shoulder main grooves 3 has a groove width W1 in a range of from 3.5% to 5.5% of the tread width TW, for example. It is preferred that each of the crown main grooves 4 has a groove width W2 in a range of from 2.5% to 4.0% of the tread width TW, for example. In a case of a tire for a passenger car, it is preferred that a groove depth of each of the shoulder main grooves 3 and the crown main grooves 4 is in a range of 5 to 10 mm, for example.

The tread portion 2 is provided with five land regions divided by the shoulder main grooves 3 and the crown main grooves 4 described above, for example. The tread portion 2 in this embodiment is provided with shoulder land regions 5, middle land regions 6, and a crown land region 7, for example. Each of the shoulder land regions 5 is defined between corresponding one of the shoulder main grooves 3 and its adjacent one of the tread edges Te, for example. Each of the middle land regions 6 is defined between one of the shoulder main grooves 3 and its adjacent one of the crown main grooves 4, for example. The crown land region 7 is defined between the two crown main grooves 4 and is arranged on the tire equator C, for example. However, the present invention is not limited to such an embodiment.

The tread portion 2 includes lateral grooves 8 extending in the tire axial direction and blocks 9 divided by the lateral grooves 8. The lateral grooves 8 include shoulder lateral grooves 10 arranged in the shoulder land regions 5, middle lateral grooves 11 arranged in the middle land regions 6, and crown lateral grooves 12 arranged in the crown land region 7, for example. The blocks 9 include shoulder blocks 13 arranged in the shoulder land regions 5, middle blocks 14 arranged in the middle land regions 6, and crown blocks 15 arranged in the crown land region 7, for example.

Figure 2:
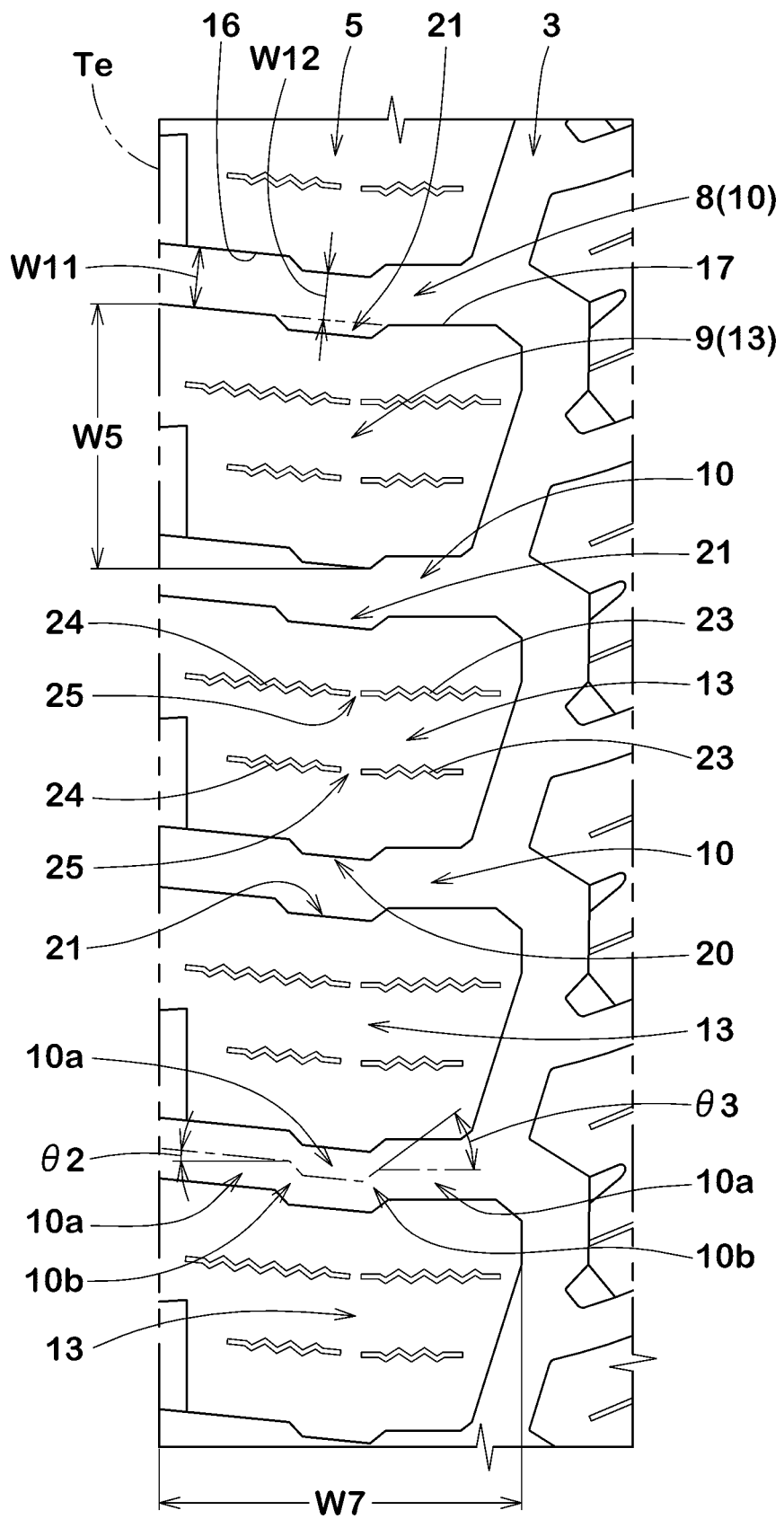
FIG. 2 is an enlarged view of one of shoulder land regions of FIG. 1.

FIG. 2 is an enlarged view of one of the shoulder land regions 5 as a figure showing one embodiment of the lateral grooves 8 and the blocks 9. As shown in FIG. 2, the shoulder lateral grooves 10 provided in the shoulder land region 5 extend between the shoulder main groove 3 and the tread edge Te. The shoulder land region 5 is provided with the shoulder blocks 13 divided by the shoulder lateral grooves 10. The shoulder blocks 13 are arranged closest among the blocks to either one of the tread edges Te.

Figure 3:
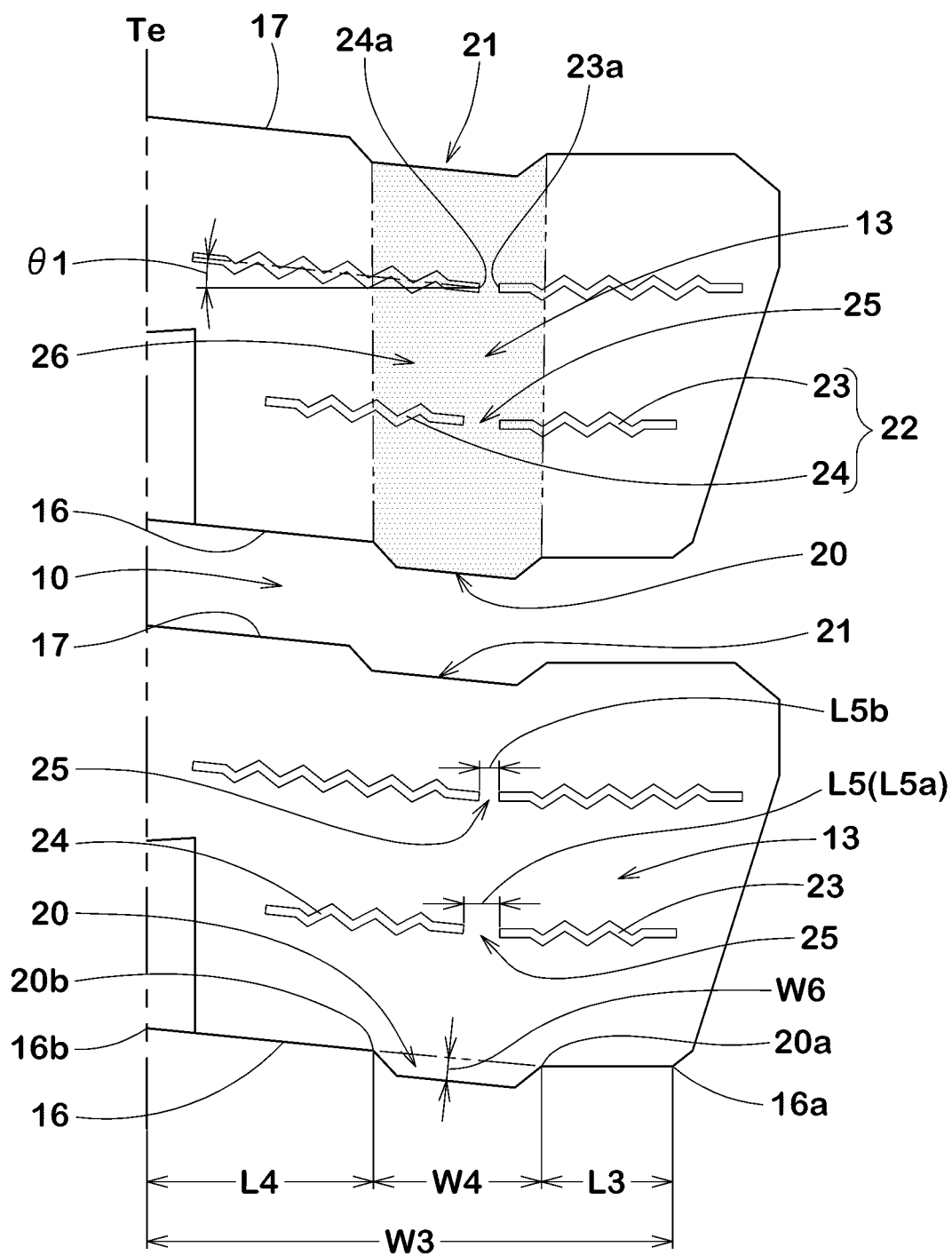
FIG. 3 is an enlarged view of shoulder blocks of FIG. 2.

FIG. 3 is an enlarged view of the shoulder blocks 13. As shown in FIG. 3, at least one, each in this embodiment, of the blocks 13 has a first lateral block wall 16 positioned on a side of one of the adjacent lateral grooves 10 and a second lateral block wall 17 positioned on a side of the other one of the adjacent lateral grooves 10. Note that each of the lateral block walls in this embodiment extends in a tire radial direction while maintaining the shape of the edge shown in a plan view of the block.

Each of the first lateral block wall 16 has a convex portion 20 partly protruding toward the lateral groove at a center portion thereof in the tire axial direction. The convex portion 20 configured as such strongly compresses snow in the lateral groove 10 during running on a snowy road, therefore, it is possible that excellent traction performance is exerted. Further, the convex portion 20 appropriately disturbs flow of air in the lateral groove 10 during running on a dry road surface, therefore, it is possible that the pumping sound generated by the lateral groove 10 is decreased.

The center portion in the tire axial direction of the first lateral block wall 16 is a region excluding both end portions in the tire axial direction. The convex portion 20 in this embodiment is provided at a position including a center position in the tire axial direction of the first lateral block wall 16. However, the convex portion 20 may be provided at a position deviated from the center position, for example.

In a preferred embodiment, a distance L3 in the tire axial direction between an end 16a on one side in the tire axial direction of the first lateral block wall 16 and an end 20a on the one side of the convex portion 20 and a distance L4 in the tire axial direction between an end 16b on the other side in the tire axial direction of the first lateral block wall 16 and an end 20b on the other side of the convex portion 20 are each in a range of from 0.20 to 0.50 times a width W3 in the tire axial direction of the first lateral block wall 16, for example.

The above "partly protruding" means that a width W4 in the tire axial direction of the convex portion 20 is less than 0.50 times the width W3 in the tire axial direction of the first lateral block wall 16. The width W4 of the convex portion 20 is preferably not more than 0.40 times, more preferably not more than 0.35 times, and preferably not less than 0.20 times, more preferably not less than 0.25 times the width W3 of the first lateral block wall. The convex portion 20 configured as such can improve the on-ice/on-snow performance and the noise performance in a good balance.

The convex portion 20 has a quadrangular ground contacting surface, for example, in a plan view of the block, and in this embodiment, it has a trapezoidal ground contacting surface. However, it is not limited to such an embodiment, and the ground contacting surface of the convex portion 20 may be triangular or semicircular, for example.

It is preferred that a protruding width W6 of the convex portion 20 is in a range of from 3% to 10% of a width W5 (shown in FIG. 2) in the tire circumferential direction of the block 13, for example. Note that the protruding width W6 of the convex portion 20 is defined as a distance between an imaginary line obtained by connecting both ends 20a and 20b of the convex portion 20 and an outer surface of the convex portion 20, for example.

Each of the second lateral block walls 17 has a concave portion 21 partly recessed at a center portion thereof in the tire axial direction, for example. The concave portion 21 configured as such increases volume of the lateral groove, therefore, it is possible that traction on a snowy road is improved.

In this embodiment, the blocks 13 having the block walls described above are arranged adjacently to each other in the tire circumferential direction. Thereby, in this embodiment, the groove walls of the lateral groove 10 are formed by the first lateral block wall 16 and the second lateral block wall 17 facing each other. In a preferred embodiment, the convex portion 20 of the first lateral block wall 16 and the concave portion 21 of the second lateral block wall 17 face each other. Thereby, while the volume of the lateral groove is maintained, the flow of air in the lateral groove during running on a dry road surface is disturbed. Therefore, the on-ice/on-snow performance and the noise performance are improved in a good balance.

At least one, each in this embodiment, of the blocks 13 includes a sipe pair 22 consisting of a first lateral sipe 23 and a second lateral sipe 24 adjacent to each other in the tire axial direction with a gap 25 therebetween. The sipe pair 22 can improve the on-ice/on-snow performance while maintaining rigidity of the block. Note that, in this specification, the term "sipe" means a cut or a groove having a width not more than 1.5 mm.

It is preferred that each of the blocks 13 is provided with a plurality of the sipe pairs 22, for example, and in this embodiment, each of the blocks 13 is provided with two sipe pairs 22.

The first lateral sipe 23 and the second lateral sipe 24 adjacent to each other in the tire axial direction include an embodiment in which an end 23a of the first lateral sipe 23 and an end 24a of the second lateral sipe 24 are adjacent to each other in the tire axial direction but are misaligned in the tire circumferential direction. In this embodiment, a distance in the tire circumferential direction between the end 23a and the end 24a is preferably not more than 0.20 times, more preferably not more than 0.10 times the width W5 (shown in FIG. 2) in the tire circumferential direction of the block 13.

It is preferred that both ends of the first lateral sipe 23 and the second lateral sipe 24 terminate within the block, for example. Further, it is preferred that each of the first lateral sipe 23 and the second lateral sipe 24 extends in a zigzag manner in the tire axial direction. The lateral sipes configured as such can effectively maintain the rigidity of the block. Furthermore, it is preferred that each of the lateral sipes 23 and 24 is arranged at an angle $\theta 1$ not more than 10 degrees with respect to the tire axial direction, for example. The first lateral sipes 23 and the second lateral sipes 24 configured as such can provide large traction during running on an icy road.

The gap 25 is arranged in a convex portion projection area 26 obtained by extending the convex portion 20 along the tire circumferential direction. Thereby, it is possible that decrease of the rigidity of the convex portion 20 is suppressed, therefore, snow in the lateral groove is compressed more strongly during running on a snowy road. Further, block rigidity is maintained by such arrangement of the gap 25 and the convex portion 20, therefore, anti-wear performance and steering stability on a dry road surface are improved.

It is preferred that a length L5 in the tire axial direction of the gap 25 is in a range of from 1% to 10% of a width W7 (shown in FIG. 2) in the tire axial direction of the block 13, for example. Thereby, while the rigidity of the block is maintained, a length of each lateral sipes is secured. Therefore, the steering stability on a dry road surface and the on-ice/on-snow performance are improved in a good balance.

It is preferred that at least one, each in this embodiment, of the blocks 13 has a plurality of the sipe pairs 22 having different lengths of the gaps 25 in the tire axial direction. In this embodiment, it is preferred that a length L5a of the gap 25 of the sipe pair 22 arranged on a side of the first lateral block wall 16 is in a range of from 1.5 to 2.5 times a length L5b of the gap of the sipe pair 22 arranged on a side of the second lateral block wall 17, for example. Thereby, the convex portion 20 becomes difficult to be deformed, therefore, the convex portion 20 can compress snow in the groove further strongly.

As shown in FIG. 2, each of the shoulder lateral grooves 10 are formed by the first lateral block wall 16 and the second lateral block wall 17, therefore, it includes a plurality of lateral groove portions 10a and connecting portions 10b connecting therebetween. Each of the lateral groove portions 10a are arranged at an angle $\theta 2$ not more than 10 degrees with respect to the tire axial direction, for example. Each of the connecting portions 10b is arranged between a pair of the lateral groove portions 10a adjacent to each other and inclined at an angle $\theta 3$ in a range of from 50 to 70 degrees with respect to the tire axial direction, for example. Each of the shoulder lateral grooves 10 in this embodiment includes three lateral groove portions 10a and two connecting portions 10b, for example. The two connecting portions 10b are inclined in opposite directions to each other. Thereby, the pumping sound of the shoulder lateral grooves 10 is suppressed.

It is preferred that a minimum groove width W12 of the lateral groove if the concave portion 21 is completely filled is in a range of from 0.70 to 0.90 times a maximum groove width W11 of the lateral groove. Thereby, the on-ice/on-snow performance and the noise performance are improved in a good balance.

Figure 4:
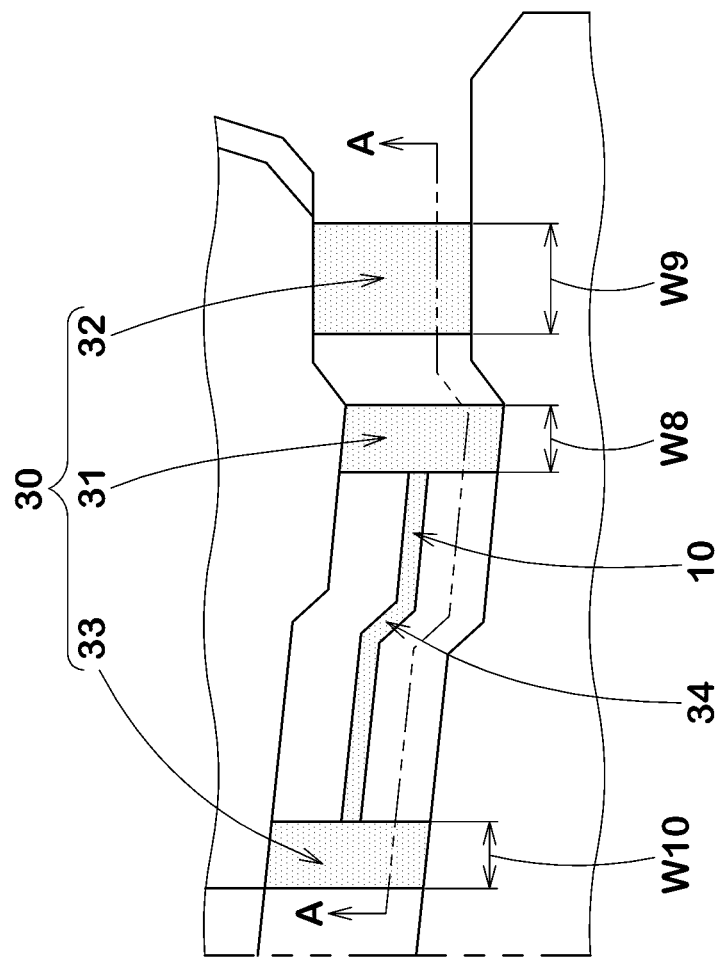
FIG. 4 is an enlarged view of one of shoulder lateral grooves of FIG. 2.

FIG. 4 is an enlarged plan view of one of the shoulder lateral grooves 10 as a figure showing an embodiment of the lateral grooves 8. As shown in FIG. 4, it is preferred that each of the shoulder lateral grooves 10 has a tie bar portion 30 and a narrow rib portion 34, for example. Note that, for the purpose of easy understanding, in FIG. 4, the tie bar portion 30 and the narrow rib portion 34 are shaded. Note that these configurations are omitted in FIGS. 1 to 3.

The tie bar portion 30 is formed by raising a groove bottom and connects between a pair of blocks 13 adjacent to each other, for example. The lateral groove 10 is provided with at least one tie bar portion 30, for example, and in a preferred embodiment, it is provided with a plurality of the tie bar portions 30.

Each of the tie bar portions 30 in this embodiment includes a first tie bar portion 31 connecting the convex portion 20 and the concave portion 21, for example. The first tie bar portion 31 configured as such suppresses excessive opening between the convex portion 20 and the concave portion 21 therefore, it is possible that the steering stability on a dry road surface is maintained.

In a preferred embodiment, it is preferred that at least a part of the first tie bar portion 31 is arranged in a gap projection area obtained by extending the gap(s) 25 along the tire circumferential direction, for example. Thereby, during running on a dry road surface, stress in the tire circumferential direction is applied to the gap projection area of the block. Therefore, the opening of the lateral sipe is suppressed, thereby, the steering stability of a dry road surface is further improved.

In order to improve the steering stability on a dry road surface and the on-ice/on-snow performance in a good balance, it is preferred that a width W8 in the tire axial direction of the first tie bar portion 31 is in a range of from 0.20 to 0.30 times the width W4 (shown in FIG. 3) of the convex portion 20, for example.

It is preferred that each of the tie bar portions 30 further includes a second tie bar portion 32 and a third tie bar portion 33. The second tie bar portion 32 is provided on one side in the tire axial direction of the first tie bar portion 31. The second tie bar portion 32 in this embodiment is provided on an inner side in the tire axial direction of the first tie bar portion 31, for example. The third tie bar portion 33 is provided on the other side in the tire axial direction of the first tie bar portion 31. The third tie bar portion 33 in this embodiment is provided on an outer side in the tire axial direction of the first tie bar portion 31, for example. The second tie bar portions 32 and the third tie bar portions 33 configured as such are useful for suppressing deformation of the lateral grooves while suppressing decrease of the groove volume.

In order to further increase the above-mentioned effects, each of the second tie bar portions 32 has a width W9 in the tire axial direction in a range of from 1.3 to 2.0 times that of each of the first tie bar portions 31, for example. Each of the third tie bar portions 33 has a width W10 in the tire axial direction in a range of from 0.9 to 1.1 times that of each of the first tie bar portions 31, for example. It is preferred that, in each of the shoulder blocks 13, a sum Wt of the widths in the tire axial direction of the first tie bar portion 31, the second tie bar portion 32, and the third tie bar portion 33 is in a range of from 0.20 to 0.40 times the width W7 (shown in FIG. 2) in the tire axial direction of the each of the shoulder blocks 13.

The narrow rib portion 34 connects between the first tie bar portion 31 and the third tie bar portion 33, for example. The narrow rib portion 34 extends in a longitudinal direction of the lateral groove 10 without being connected with the blocks on both sides in the tire circumferential direction. It is preferred that each of the narrow rib portions 34 extends in a zigzag manner, for example. The narrow rib portions 34 configured as such are appropriately deformed during running on a snowy road, therefore, it is possible that clogging of snow in the grooves is prevented.

Figure 5:
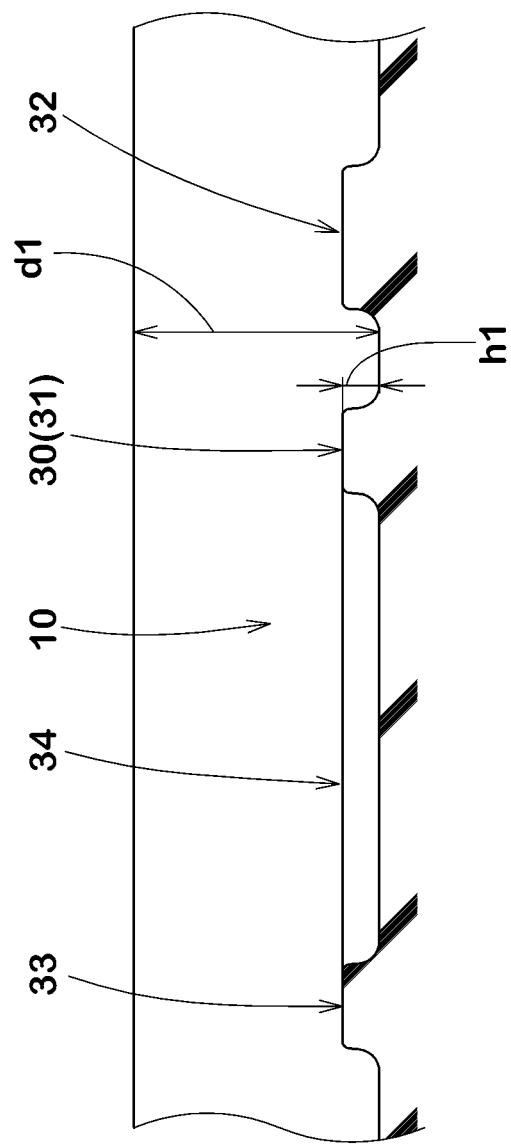
FIG. 5 is a cross-sectional view taken along A-A line of FIG. 4.

FIG. 5 is a cross-sectional view of the shoulder lateral groove 10 taken along A-A line of FIG. 4. As shown in FIG. 5, it is preferred that a height h1 of the tie bar portion 30 and the narrow rib portion 34 is in a range of from 0.10 to 0.20 times a maximum depth d1 of the lateral groove 10, for example. Thereby, the on-ice/on-snow performance and the noise performance on a dry road are improved in a good balance.

Figure 6:
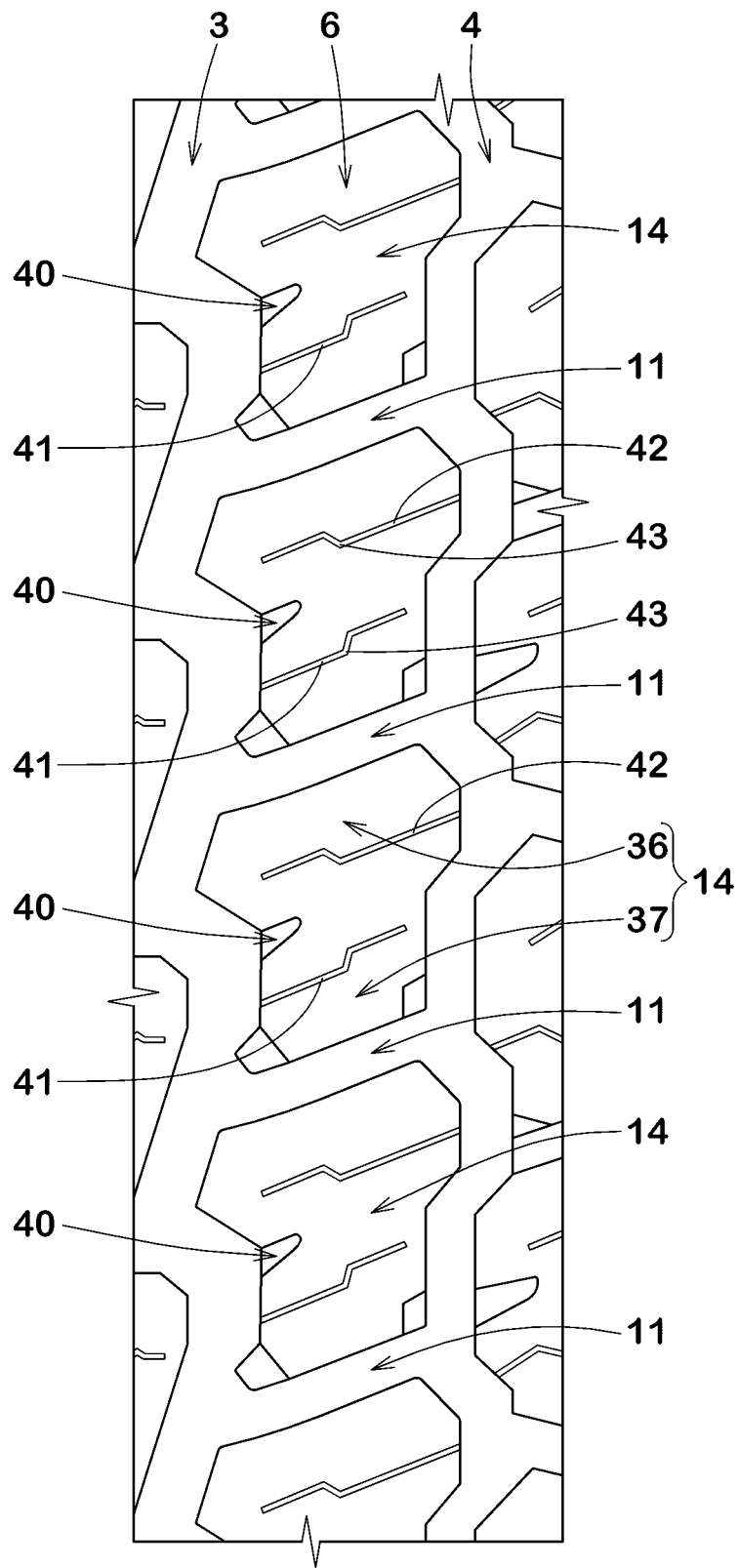
FIG. 6 is an enlarged view of one of middle land regions of FIG. 1.

FIG. 6 is an enlarged view of one of the middle land regions 6. As shown in FIG. 6, each of the middle land regions 6 is provided with a plurality of the middle lateral grooves 11 each connecting between one of the shoulder main grooves 3 and its adjacent one of the crown main grooves 4, for example. It is preferred that each of the middle lateral grooves 11 extends linearly and obliquely with respect to the tire axial direction, for example. Each of the middle land regions 6 in this embodiment includes a plurality of the middle blocks 14 divided by the middle lateral grooves 11, for example.

Each of the middle blocks 14 includes a wide portion 36 and a narrow portion 37 having a smaller width in the tire axial direction, for example. The middle blocks 14 configured as such allow the narrow portions 37 to stick themselves deeply into snow on a road surface during running on a snowy road. The wide portions 36 suppress large deformation of the narrow portions 37, therefore, it is possible that the narrow portions 37 stuck into the snow on the road surface exert large reaction force by pushing the snow aside.

Each of the middle blocks 14 is provided with a middle lateral groove 40, a first middle sipe 41, and a second middle sipe 42, for example.

The middle lateral groove 40 extends from the shoulder main groove 3 toward a center position in the tire axial direction of the block and terminates within the block, for example. It is preferred that the middle lateral groove 40 terminates before reaching the center position, for example. The middle lateral grooves 40 configured as such can improve the on-ice/on-snow performance while maintaining block rigidity.

The first middle sipe 41 extends from the shoulder main groove 3 toward the center position and terminates within the block, for example. In a preferred embodiment, the first middle sipe 41 is provided in the narrow portion 37. The second middle sipe 42 extends from the crown main groove 4 toward the center position and terminates within the block, for example. In a preferred embodiment, the second middle sipe 42 is provided in the wide portion 36. In a further preferred embodiment, each of the first middle sipe 41 and the second middle sipe 42 crosses the central position. The first middle sipes 41 and the second middle sipes 42 can increase the traction during running on an icy road by edges thereof.

In order to suppress an excessive decrease in the rigidity of the middle blocks 14, it is preferred that each of the first middle sipes 41 and the second middle sipes 42 has at least one bent portion 43. In a preferred embodiment, each of the middle sipes 41 and 42 has two bent portions 43 which are convex in opposite directions to each other.

Figure 7:
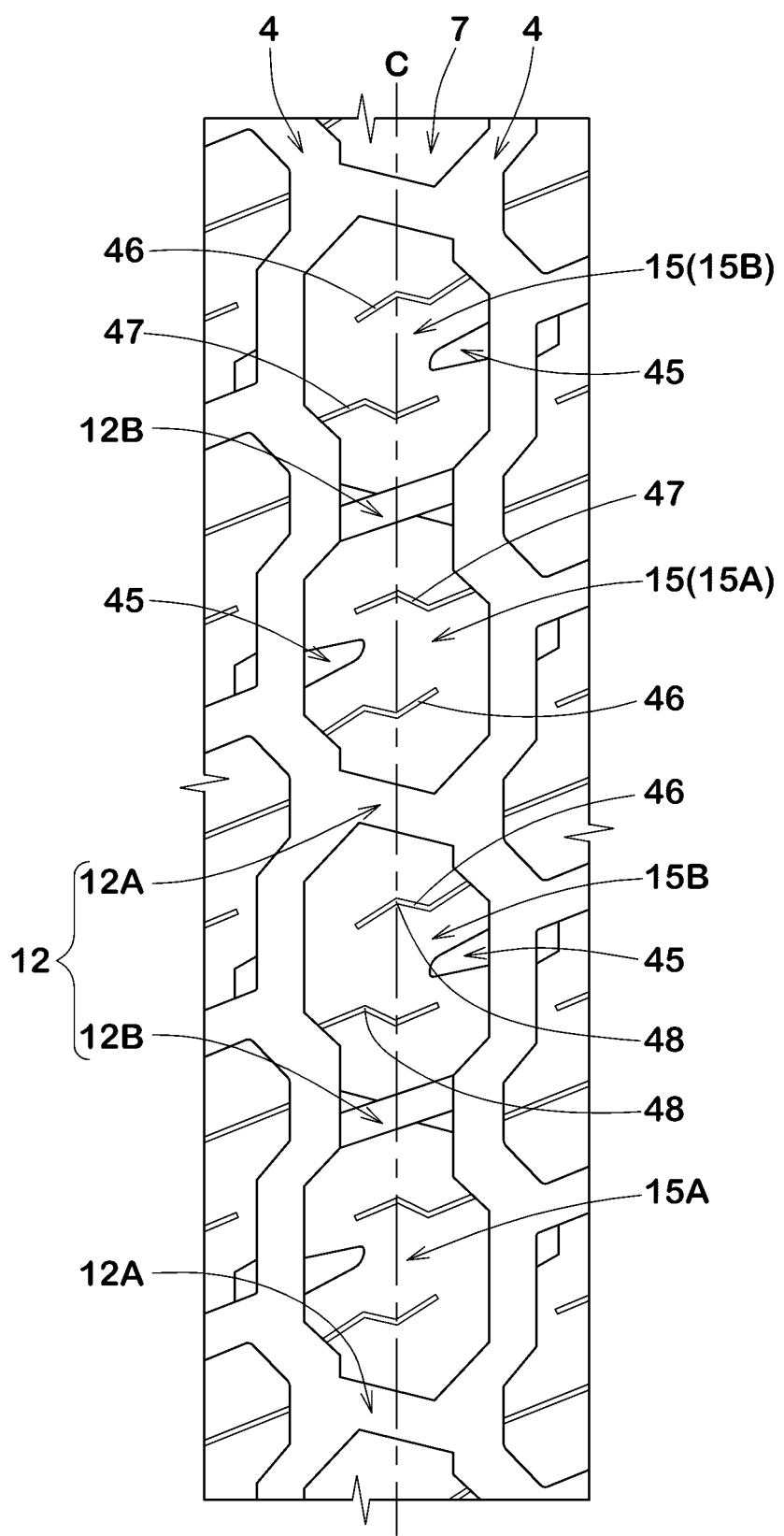
FIG. 7 is an enlarged view of a crown land region of FIG. 1.

FIG. 7 is an enlarged view of the crown land region 7. As shown in FIG. 7, the crown land region 7 is provided with a plurality of the crown lateral grooves 12 each connecting between the two crown main grooves 4, for example.

The crown lateral grooves 12 include first crown lateral grooves 12A and second crown lateral grooves 12B, for example. The first crown lateral grooves 12A and the second crown lateral grooves 12B are inclined in opposite directions to each other with respect to the tire axial direction, for example. The first crown lateral grooves 12A and the second crown lateral grooves 12B are arranged alternately in the tire circumferential direction.

Each of the second crown lateral grooves 12B has a groove depth smaller than that of each of the first crown lateral grooves 12A, for example. Thereby, it is possible that frequency bands of the pumping sound generated by the first crown lateral grooves 12A and the second crown lateral grooves 12B are dispersed.

The crown land region 7 in this embodiment includes a plurality of the crown blocks 15 divided by the crown lateral grooves 12 described above, for example. The crown blocks 15 include first crown blocks 15A and second crown blocks 15B arranged alternately in the tire circumferential direction, for example. In this embodiment, one of the first crown blocks 15A and one of the second crown blocks 15B adjacent thereto with one of the second crown lateral grooves 12B having a small groove depth therebetween form a block pair. The crown land region 7 in this embodiment has a plurality of the block pairs arranged in the tire circumferential direction, for example.

It is preferred that the first crown blocks 15A and the second crown blocks 15B have point symmetrical shapes, for example.

Each of the crown blocks 15 is provided with a crown lateral groove 45, a first crown sipe 46, and a second crown sipe 47, for example.

The crown lateral groove 45 extends from one of the crown main grooves 4 toward a center position in the tire axial direction of the block and terminates within the block, for example. It is preferred that the crown lateral groove 45 terminates before reaching the center position, for example.

The first crown sipe 46 extends from one of edges of the block connected with the crown lateral groove 45 toward the center position and terminates within the block, for example. The second crown sipe 47 extends from one of the edges opposite to the edge connected with the crown lateral groove 45 toward the center position and terminates within the block, for example. In a more preferred embodiment, each of the first crown sipe 46 and the second crown sipe 47 crosses the center position. The first crown sipes 46 and the second crown sipes 47 configured as such decrease impact sound generated when the blocks come into contact with the ground, therefore, it is possible that the noise performance is improved.

In order to suppress excessive decrease in the rigidity of the blocks, it is preferred that each of the first crown sipes 46 and the second crown sipes 47 has at least one bent portion 48. In a preferred embodiment, each of the crown sipes 46 and 47 has two bent portions 48 that are convex in opposite directions to each other.

While detailed description has been made of the tire as an embodiment of the present invention, the present invention can be embodied in various forms without being limited to the illustrated embodiment.

WORKING EXAMPLE (EXAMPLE)

Figure 8:
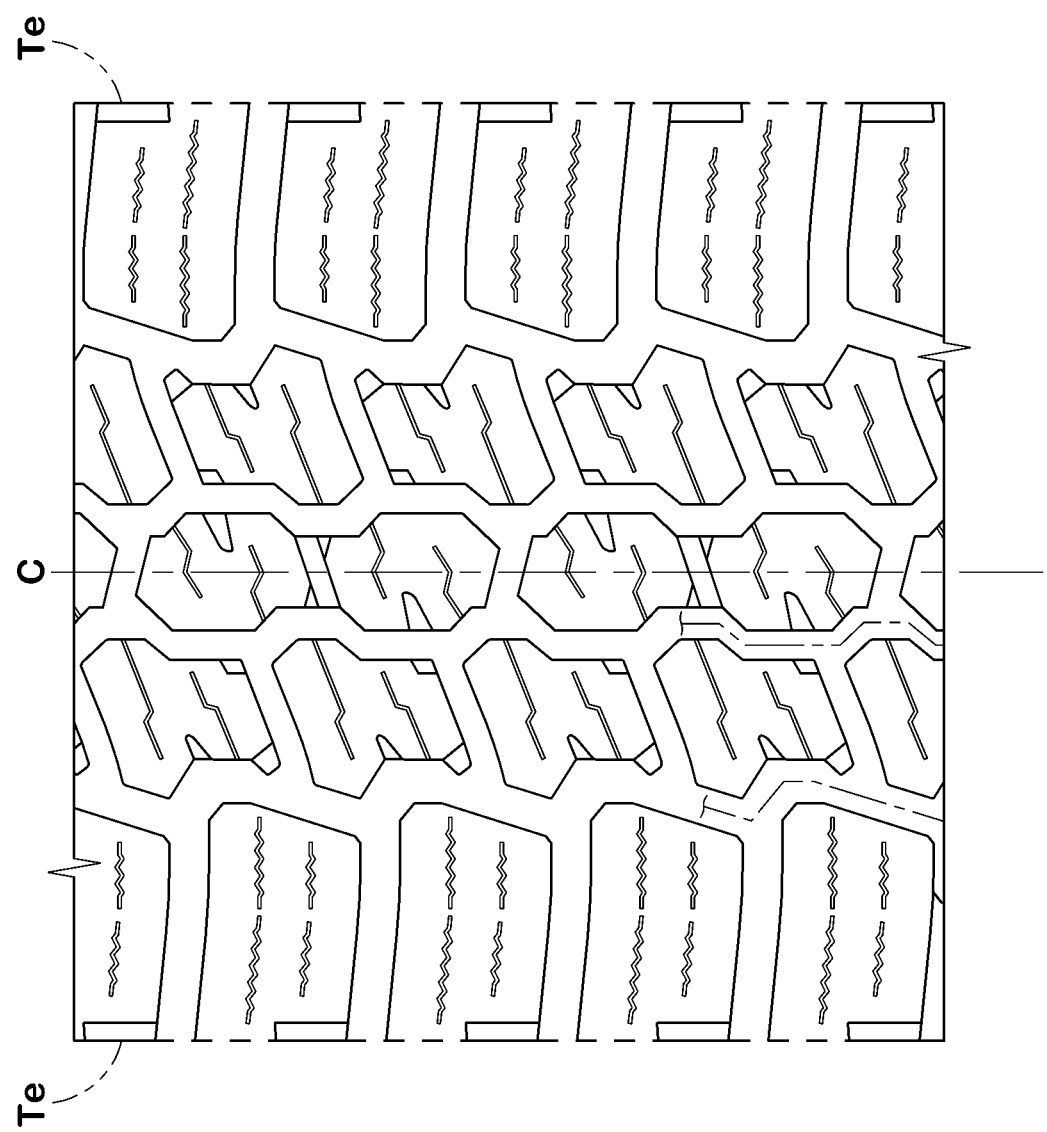
FIG. 8 is a development view of the tread portion of a tire as reference.

Tires of size 265/70R17 having the basic pattern shown in FIG. 1 were made by way of test according to the specifications listed in Table 1. As a Reference, as shown in FIG. 8, tires not provided with convex portions and concave portions in the shoulder blocks were made by way of test. Each of the test tires was tested for the on-ice/on-snow performance and the noise performance. Common specifications of the test tires and the test methods are as follows.

Tire rim: 17×8.0 J
Tire inner pressure: 220 kPa
Test car: 4WD-car with displacement of 2400 cc
Tire mounting position: all wheels
<On-Ice/On-Snow Performance>

A distance needed for accelerating the above test car from 5 km/h to 20 km/h on a course covered with compacted snow was measured by GPS. The results are indicated by an index based on the measured distance of the Reference being 100, wherein the smaller the numerical value, the better the on-ice/on-snow performance is.
<Noise Performance>

In-car noise was measured during the above-described test car was driven at a speed of 100 km/h on a dry road surface. The test results are indicated by an index based on the Reference being 100, wherein the smaller the numerical value, the smaller the in-car noise is, which means better noise performance.

The test results are shown in Table 1.

TABLE 1

| | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| FIG. showing tread pattern | FIG. 8 | FIG. 1 | FIG. 1 | FIG. 1 | FIG. 1 | FIG. 1 | FIG. 1 | FIG. 1 | FIG. 1 |
| Length L5a of Gap/width w7 of Block [%] | 5.5 | 5.5 | 1.0 | 4.0 | 7.0 | 10.0 | 5.5 | 5.5 | 5.5 |
| Groove width W12 of Lateral groove if Concave portion is filled/Maximum groove width W11 of Lateral groove | — | 0.78 | 0.78 | 0.78 | 0.78 | 0.78 | 0.70 | 0.75 | 0.85 |
| Height h1 of Tie bar portion/Depth d1 of Lateral groove | 0.15 | 0.15 | 0.15 | 0.15 | 0.15 | 0.15 | 0.15 | 0.15 | 0.15 |
| width W8 of First tie bar portion/Width W4 of Convex portion | 0.26 | 0.26 | 0.26 | 0.26 | 0.26 | 0.26 | 0.26 | 0.26 | 0.26 |
| Sum wt of widths of First, Second, and Third tie bar portions/Width W7 of Shoulder block | 0.26 | 0.26 | 0.26 | 0.26 | 0.26 | 0.26 | 0.26 | 0.26 | 0.26 |
| On-ice/on-snow performance [index] | 100 | 95 | 95 | 95 | 96 | 97 | 97 | 96 | 95 |
| Noise performance [index] | 100 | 92 | 97 | 95 | 93 | 94 | 92 | 92 | 94 |

TABLE 1-continued

| | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| FIG. showing tread pattern | FIG. 1 | FIG. 1 | FIG. 1 | FIG. 1 | FIG. 1 | FIG. 1 | FIG. 1 | FIG. 1 | FIG. 1 |
| Length L5a of Gap/Width W7 of Block [%] | 5.5 | 5.5 | 5.5 | 5.5 | 5.5 | 5.5 | 5.5 | 5.5 | 5.5 |
| Groove width W12 of Lateral groove if Concave portion is filled/Maximum groove width W11 of Lateral groove | 0.90 | 0.78 | 0.78 | 0.78 | 0.78 | 0.78 | 0.78 | 0.78 | 0.78 |
| Height h1 of Tie bar portion/Depth d1 of Lateral groove | 0.15 | 0.10 | 0.12 | 0.17 | 0.20 | 0.15 | 0.15 | 0.15 | 0.15 |
| Width W8 of First tie bar portion/Width W4 of Convex portion | 0.26 | 0.26 | 0.26 | 0.26 | 0.26 | 0.20 | 0.30 | 0.26 | 0.26 |
| Sum Wt of widths of First, Second, and Third tie bar portions/Width W7 of Shoulder block | 0.26 | 0.26 | 0.26 | 0.26 | 0.26 | 0.26 | 0.26 | 0.20 | 0.40 |
| On-ice/on-snow performance [index] | 94 | 94 | 94 | 96 | 97 | 95 | 96 | 94 | 96 |
| Noise performance [index] | 95 | 95 | 93 | 92 | 92 | 94 | 92 | 95 | 92 |

From the test results, it was confirmed that the tires as Examples exerted excellent on-ice/on-snow performance and the noise performance on a dry road surface.

The invention claimed is:

1. A tire comprising a tread portion comprising a plurality of lateral grooves extending in a tire axial direction and blocks divided by the lateral grooves, wherein
at least one of the blocks comprises a first lateral block wall positioned on a side of one of the adjacent lateral grooves and a sipe pair consisting of a first lateral sipe and a second lateral sipe adjacent to each other in the tire axial direction with a gap therebetween,
the first lateral block wall has, at a center portion thereof in the tire axial direction, a convex portion partly protruding toward the one of the adjacent lateral grooves,
the gap is arranged in a convex portion projection area obtained by extending the convex portion along a tire circumferential direction,
the convex portion has a trapezoidal ground contacting surface in a plan view of the at least one of the blocks, and
the gap is a continuous portion of the ground contacting surface of the block;
wherein
the at least one of the blocks comprises a second lateral block wall positioned on a side of the other one of the adjacent lateral grooves,
the second lateral block wall has a concave portion partly recessed at a center portion thereof in the tire axial direction, and
the concave portion has a trapezoidal shape in a plan view of the at least one of the blocks;
wherein
a pair of the blocks are adjacent in the tire circumferential direction with one of the lateral grooves therebetween,
groove walls of the one of the lateral grooves are formed by the first lateral block wall of one of the pair of the blocks and the second lateral block wall of the other one of the pair of the blocks, and
the convex portion and the concave portion face each other; and
wherein
a minimum groove width of the one of the lateral grooves if the concave portion is completely filled is in a range of from 0.70 to 0.90 times a maximum groove width of the one of the lateral grooves.

2. The tire according to claim 1, wherein
the blocks are shoulder blocks each arranged closest to one of tread edges.

3. The tire according to claim 1, wherein
an upper base of the trapezoidal ground contacting surface of the convex portion includes a center position in the tire axial direction of the first lateral block wall.

4. The tire according to claim 1, wherein
each of the first lateral sipe and the second lateral sipe extends in a zigzag manner.

5. The tire according to claim 1, wherein
each of the blocks has a plurality of the sipe pairs having different lengths of the gaps in the tire axial direction.

6. The tire according to claim 1, wherein
the length of the gap or each of the lengths of the gaps in the tire axial direction is in a range of from 1% to 10% of a width in the tire axial direction of the at least one of the blocks.

7. The tire according to claim 1, wherein in the trapezoidal ground contacting surface, an angle of an upper base is 10 degrees or less with respect to the tire axial direction and an angle of each side is 50 degrees or more and 70 degrees or less with respect to the tire axial direction.

8. The tire according to claim 1, wherein a distance in the tire axial direction between an end on one side in the tire axial direction of the first lateral block wall and an end on the one side of the convex portion and a distance in the tire axial direction between an end on the other side in the tire axial direction of the first lateral block wall and an end on the other side of the convex portion are each in a range of from 0.20 to 0.50 times a width in the tire axial direction of the first lateral block wall.

9. The tire according to claim 1, wherein a protruding width of the convex portion is in a range of from 3% to 10% of a width in the tire circumferential direction of the block.

10. The tire according to claim 1, wherein an end of the first lateral sipe and an end of the second lateral sipe are facing each other adjacently in the tire axial direction but are misaligned in the tire circumferential direction.

11. The tire according to claim 1, wherein both ends of the first lateral sipe and the second lateral sipe terminate within the block so as to each have a closed terminating end.

12. The tire according to claim 1, wherein
the one of the lateral grooves has at least one tie bar portion formed by raising a groove bottom thereof and connecting between the pair of the blocks.

13. The tire according to claim 12, wherein
the tie bar portion includes a first tie bar portion connecting the convex portion and the concave portion.

14. The tire according to claim 13, wherein
at least a part of the first tie bar portion is arranged in a gap projection area obtained by extending the gap or the gaps along the tire circumferential direction.

15. A tire comprising a tread portion comprising a plurality of lateral grooves extending in a tire axial direction and blocks divided by the lateral grooves, wherein at least one of the blocks comprises a first lateral block wall positioned on a side of one of the adjacent lateral grooves and a sipe pair consisting of a first lateral sipe and a second lateral sipe adjacent to each other in the tire axial direction with a gap therebetween, the first lateral block wall has, at a center portion thereof in the tire axial direction, a convex portion partly protruding toward the one of the adjacent lateral grooves, the gap is arranged in a convex portion projection area obtained by extending the convex portion along a tire circumferential direction, the convex portion has a trapezoidal ground contacting surface in a plan view of the at least one of the blocks, and the gap is a continuous portion of the ground contacting surface of the block;

wherein the at least one of the blocks comprises a second lateral block wall positioned on a side of the other one of the adjacent lateral grooves, the second lateral block wall has a concave portion partly recessed at a center portion thereof in the tire axial direction, and the concave portion has a trapezoidal shape in a plan view of the at least one of the blocks;

wherein a pair of the blocks are adjacent in the tire circumferential direction with one of the lateral grooves therebetween, groove walls of the one of the lateral grooves are formed by the first lateral block wall of one of the pair of the blocks and the second lateral block wall of the other one of the pair of the blocks, and the convex portion and the concave portion face each other;

wherein the one of the lateral grooves has at least one tie bar portion formed by raising a groove bottom thereof and connecting between the pair of the blocks;

wherein the tie bar portion includes a first tie bar portion connecting the convex portion and the concave portion; and wherein the tie bar portion includes a second tie bar portion arranged on one side in the tire axial direction of the first tie bar portion and a third tie bar portion arranged on the other side in the tire axial direction of the first tie bar portion, and no tie bar connecting between the pair of the blocks is provided between the first tie bar portion and the second tie bar portion and between the first tie bar portion and the third tie bar portion.

16. The tire according to claim 15, wherein the one of the lateral grooves has a narrow rib portion connecting the first tie bar portion and the third tie bar portion, and the narrow rib portion extends in a longitudinal direction of the lateral groove without being connected with the blocks on both sides in the tire circumferential direction.

* * * * *